United States Patent
Kim

(10) Patent No.: US 9,699,399 B2
(45) Date of Patent: Jul. 4, 2017

(54) MOBILE TERMINAL AND CONTROL METHOD THEREOF

(71) Applicant: LG ELECTRONICS INC., Seoul (KR)

(72) Inventor: Jihwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 429 days.

(21) Appl. No.: 13/679,845

(22) Filed: Nov. 16, 2012

(65) Prior Publication Data
US 2013/0141551 A1 Jun. 6, 2013

(30) Foreign Application Priority Data
Dec. 2, 2011 (KR) .................. 10-2011-0128522

(51) Int. Cl.
| | |
|---|---|
| *H04N 5/445* | (2011.01) |
| *H04N 13/04* | (2006.01) |
| *H04N 21/414* | (2011.01) |
| *H04N 21/426* | (2011.01) |
| *H04N 21/431* | (2011.01) |
| *H04N 21/439* | (2011.01) |
| *H04N 21/44* | (2011.01) |
| *H04N 21/488* | (2011.01) |

(52) U.S. Cl.
CPC ............ *H04N 5/445* (2013.01); *H04N 13/04* (2013.01); *H04N 21/41407* (2013.01); *H04N 21/42653* (2013.01); *H04N 21/4312* (2013.01); *H04N 21/4394* (2013.01); *H04N 21/44008* (2013.01); *H04N 21/44012* (2013.01); *H04N 21/4884* (2013.01)

(58) Field of Classification Search
CPC ........... H04N 21/4884; H04N 21/4888; H04N 21/414; H04N 21/485; H04N 21/488; H04N 21/426; H04N 21/431; H04N 21/439; H04N 21/44; H04N 5/445; H04N 13/04

See application file for complete search history.

(56) References Cited

U.S. PATENT DOCUMENTS

| | | | |
|---|---|---|---|
| 7,659,942 B2 | 2/2010 | Nakayama | |
| 8,922,622 B2* | 12/2014 | Hamada | H04N 13/004 348/43 |
| 2002/0154246 A1* | 10/2002 | Hawkins | 348/465 |
| 2003/0216922 A1 | 11/2003 | Gonzales et al. | |

(Continued)

OTHER PUBLICATIONS

European Patent Office Application Serial No. 12194929.1, Search Report dated Dec. 13, 2013, 6 pages.

*Primary Examiner* — Randy Flynn
(74) *Attorney, Agent, or Firm* — Lee, Hong, Degerman, Kang & Waimey

(57) ABSTRACT

A mobile terminal which reproduces a video including image data and audio data and a control method thereof are provided. The mobile terminal which reproduces a video including image data and audio data includes a display unit configured to display an image corresponding to the image data based on a reproduction command with respect to the video, a subtitle processing unit configured to output subtitles related to the video along with the image to the display unit, and a controller configured to control the subtitle processing unit to change a display format of the subtitles according to sound characteristics of the audio data related to the image.

16 Claims, 15 Drawing Sheets

(56) References Cited

U.S. PATENT DOCUMENTS

| | | | |
|---|---|---|---|
| 2005/0038661 A1* | 2/2005 | Momosaki et al. | 704/275 |
| 2007/0121005 A1* | 5/2007 | Gutta et al. | 348/468 |
| 2007/0253680 A1* | 11/2007 | Mizote et al. | 348/564 |
| 2008/0129864 A1* | 6/2008 | Stone et al. | 348/468 |
| 2008/0254826 A1* | 10/2008 | Kwon | 348/468 |
| 2009/0207305 A1* | 8/2009 | Fujita et al. | 348/468 |
| 2009/0273711 A1* | 11/2009 | Chapdelaine et al. | 348/465 |
| 2010/0097523 A1* | 4/2010 | Shin | 348/468 |
| 2010/0146445 A1 | 6/2010 | Kraut | |
| 2010/0238267 A1 | 9/2010 | Izzat et al. | |
| 2010/0238323 A1* | 9/2010 | Englund | H04N 5/23212 348/239 |
| 2011/0090312 A1* | 4/2011 | Uchimura | 348/43 |
| 2011/0246172 A1* | 10/2011 | Liberman et al. | 348/14.09 |

* cited by examiner

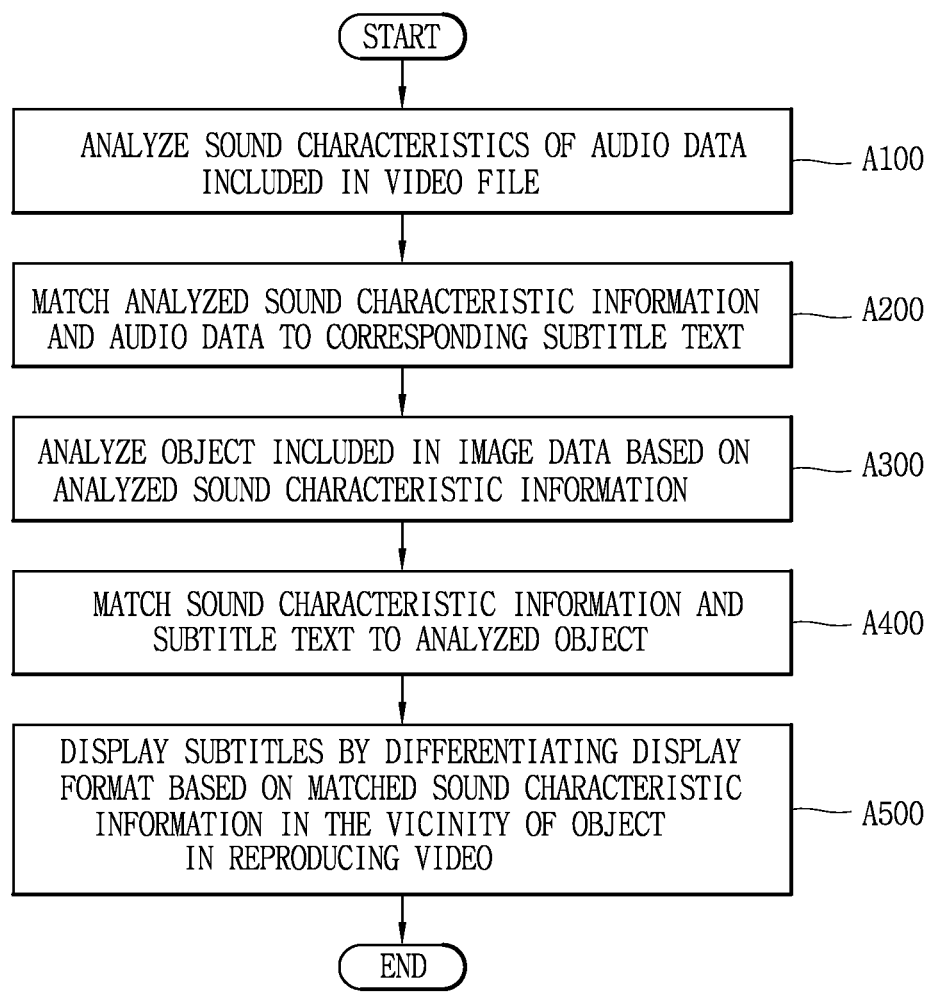

FIG. 6C
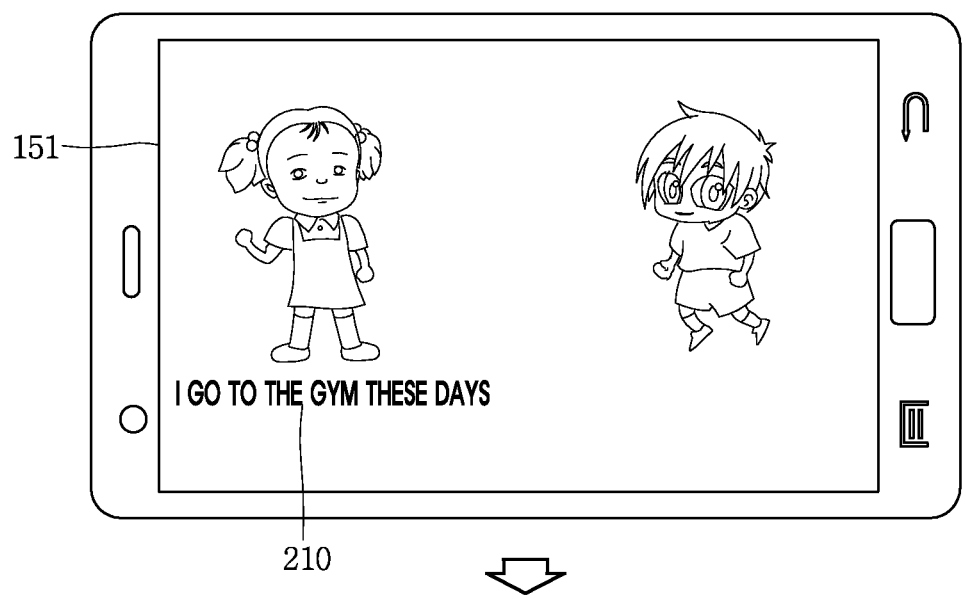
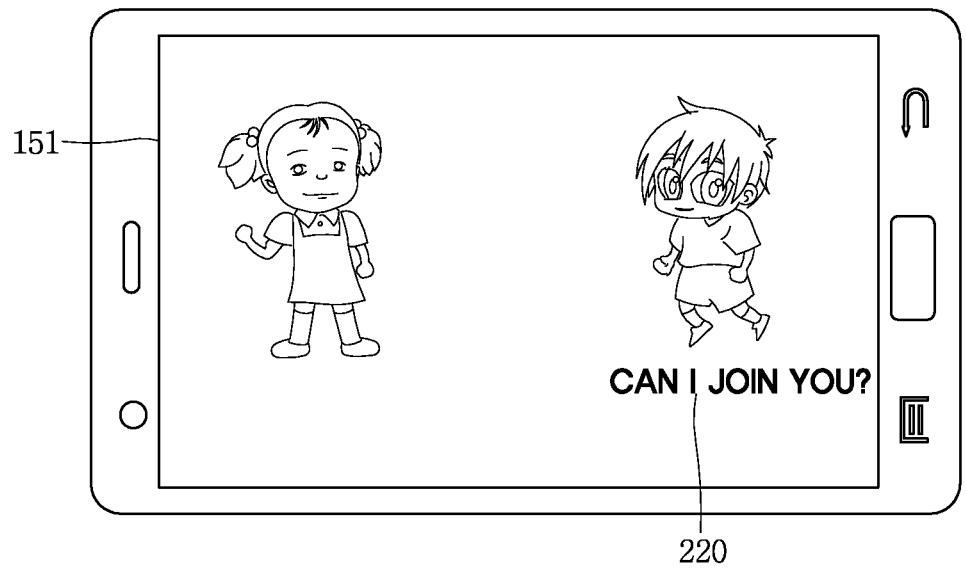

FIG. 14
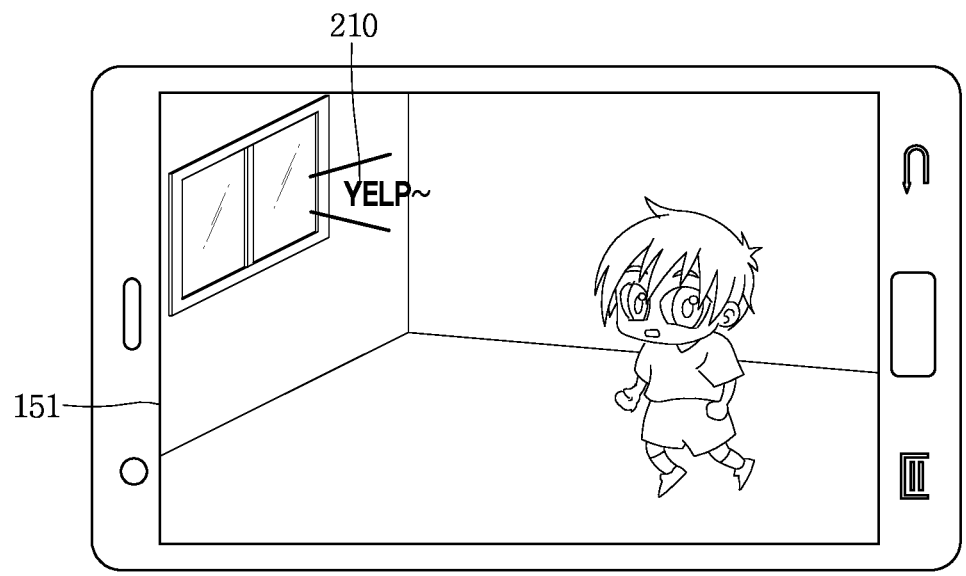
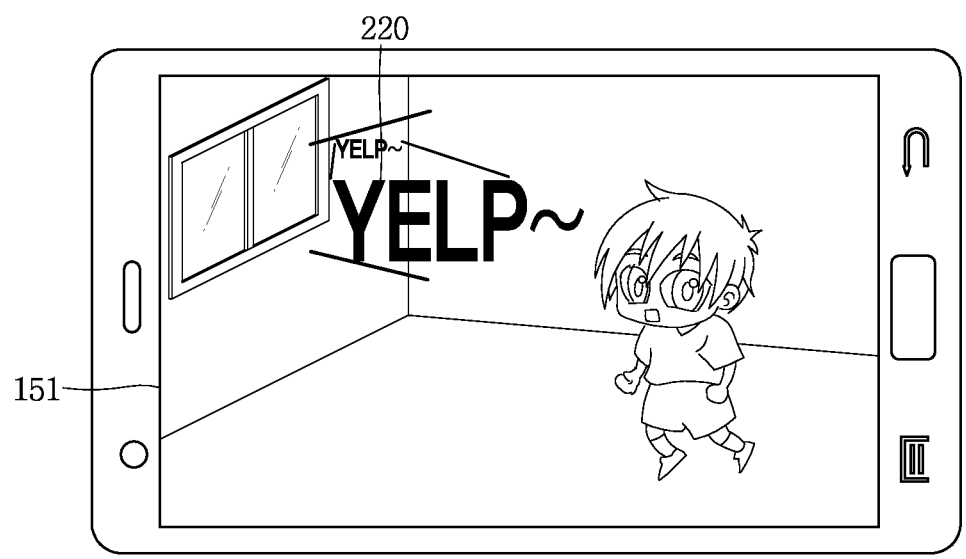

MOBILE TERMINAL AND CONTROL METHOD THEREOF

CROSS REFERENCE TO RELATED APPLICATIONS

Pursuant to 35 U.S.C. §119(a), this application claims the benefit of earlier filing date and right of priority to Korean Application No. 10-2011-0128522, filed on Dec. 2, 2011, the contents of which are hereby incorporated by reference herein in it's entirety.

BACKGROUND OF THE INVENTION

Field of the Invention

The present invention relates to a mobile terminal capable of reproducing video and a control method thereof.

Description of the Related Art

A mobile terminal may be configured to perform various functions. Examples of such functions include data and voice communication function, a function of capturing images and video through a camera, a function of storing a voice, playing music files through a speaker system, a function of displaying images or video. Some mobile terminals include additional functions which supports game playing, while other terminals are configured as multimedia players. More recently, mobile terminals have been configured to receive broadcast and multicast signals to allow for viewing of videos and television programs.

Efforts are ongoing to support and increase the functionality of mobile terminals. Such efforts include software and hardware improvements, as well as changes and improvements in the structural components which form the mobile terminal.

Also, when a mobile terminal displays video along with subtitles, the subtitles are displayed only in a stereotyped format on a pre-set portion, failing to realistically express content related to the video.

SUMMARY OF THE INVENTION

An aspect of the present invention is to provide a mobile terminal and a control method thereof capable of allowing a user to easily recognize content related to a video.

Another aspect of the present invention is to provide a mobile terminal and a control method thereof capable of allowing the hearing impaired to easily recognize content of a video through subtitles displayed on the video.

According to an embodiment of the present invention, there is provided a mobile terminal which reproduces a video including image data and audio data, including: a display unit configured to display an image corresponding to the image data based on a reproduction command with respect to the video; a subtitle processing unit configured to output subtitles related to the video along with the image to the display unit; and a controller configured to control the subtitle processing unit to change a display format of the subtitles according to sound characteristics of the audio data related to the image.

In an embodiment of the present invention, the controller may differently control the display format of the subtitles based on at least one of the amplitude, the number of vibrations, and waveforms of the sound related to the audio data.

In an embodiment of the present invention, the controller may display the subtitles in a two-dimensional (2D) format or a three-dimensional (3D) format, and differently set the format for displaying the subtitles based on at least one of the amplitude, the number of vibrations, and waveforms of the sound related to the audio data.

In an embodiment of the present invention, when the subtitles are displayed three-dimensionally, a 3D depth value of the displayed subtitles may be varied according to the amplitude of the sound corresponding to the audio data.

In an embodiment of the present invention, the controller may differently set a position in which the subtitles are displayed according to the waveforms of the sound corresponding to the audio data.

In an embodiment of the present invention, the subtitles may be positioned to be adjacent to an object in relation to waveforms of the sound corresponding to the audio data among objects included in the image.

In an embodiment of the present invention, the controller may discriminate an object corresponding to a face from the image by using a face recognition algorithm and display the subtitles in the vicinity of the object corresponding to the face.

In an embodiment of the present invention, the subtitles in relation to the object corresponding to the currently output audio data on the image may be displayed in a 3D format.

In an embodiment of the present invention, when the waveforms of a sound corresponding to the audio data are different, the color of the subtitles displayed on the display unit is different.

In an embodiment of the present invention, the controller may control the size of the subtitles to be different according to the amplitude of the sound corresponding to the audio data.

In an embodiment of the present invention, the controller may compare the amplitude of the sound with a reference value, and when the amplitude of the sound is greater than the reference value according to the comparison results, the controller may display the subtitles with a size greater than a reference size corresponding to the reference value, and when the amplitude of the sound is smaller than the reference value according to the comparison results, the controller may display the subtitles with a size smaller than the reference size corresponding to the reference value.

In an embodiment of the present invention, the size of the displayed subtitles may be varied according to a difference between the amplitude of the sound and the reference value.

In an embodiment of the present invention, when the amplitude of the sound corresponding to the audio data is changed, the controller may change at least one of the size and thickness of subtitles being displayed.

In an embodiment of the present invention, when the amplitude of the sound is increased, the controller may increase the size of the displayed subtitles in proportion to the increased degree of the amplitude, and when the amplitude of the sound is decreased, the controller may decrease the size of the displayed subtitles in proportion to the decreased degree of the amplitude.

In an embodiment of the present invention, as the amplitude of the sound is increased, the displayed subtitles may be changed from 2D into 3D, and as the amplitude of the sound is increased, a depth value of the subtitles displayed three-dimensionally may be changed.

According to another embodiment of the present invention, there is provided a method for controlling a mobile terminal which reproduces a video including image data and audio data, including: when a video is reproduced, displaying an image corresponding to the image data on a display unit; and displaying subtitles in relation to the image along with the image by changing a display format according to sound characteristics of audio data in relation to the image.

In an embodiment of the present invention, the subtitles may be displayed three-dimensionally, and a depth value of 3D subtitles may be varied according to the amplitude of a sound in relation to the audio data.

In an embodiment of the present invention, the subtitles may be displayed in different positions according to waveforms of the sound in relation to the audio data, and may be positioned to be adjacent to an object corresponding to the waveforms of the sound among objects included in the image.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein:

FIGS. 4 and 5 are flow charts illustrating a control method of the mobile terminal according to an embodiment disclosed in the present disclosure.

FIGS. 6A, 6B, 6C, and 7 are conceptual views explaining a method for displaying subtitles according to the characteristics of a sound in the mobile terminal according to an embodiment disclosed in the present disclosure.

FIGS. 12, 13, and 14 are conceptual views explaining a method for displaying subtitles according to the amplitude in the mobile terminal according to an embodiment disclosed in the present disclosure.

DETAILED DESCRIPTION OF THE INVENTION

The embodiments of the present invention will now be described with reference to the accompanying drawings, in which like numbers refer to like elements throughout although the embodiments are different, and a description of the like elements a first embodiment will be used for those of the different embodiment. In the following description, usage of suffixes such as 'module', 'part' or 'unit' used for referring to elements is given merely to facilitate explanation of the present invention, without having any significant meaning by itself. In describing the present invention, if a detailed explanation for a related known function or construction is considered to unnecessarily divert the gist of the present invention, such explanation has been omitted but would be understood by those skilled in the art. The accompanying drawings of the present invention aim to facilitate understanding of the present invention and should not be construed as limited to the accompanying drawings.

Mobile terminals described in the present disclosure may include mobile phones, smart phones, notebook computers, tablet computers, digital broadcast receivers, PDAs (Personal Digital Assistants), PMPs (Portable Multimedia Player), navigation devices, and the like. However, it would be understood by a person skilled in the art that the configuration according to embodiments of the present invention can be also applicable to the fixed types of terminals such as digital TVs, desk top computers, and the like, except for any elements especially configured for a mobile purpose.

Figure 1:
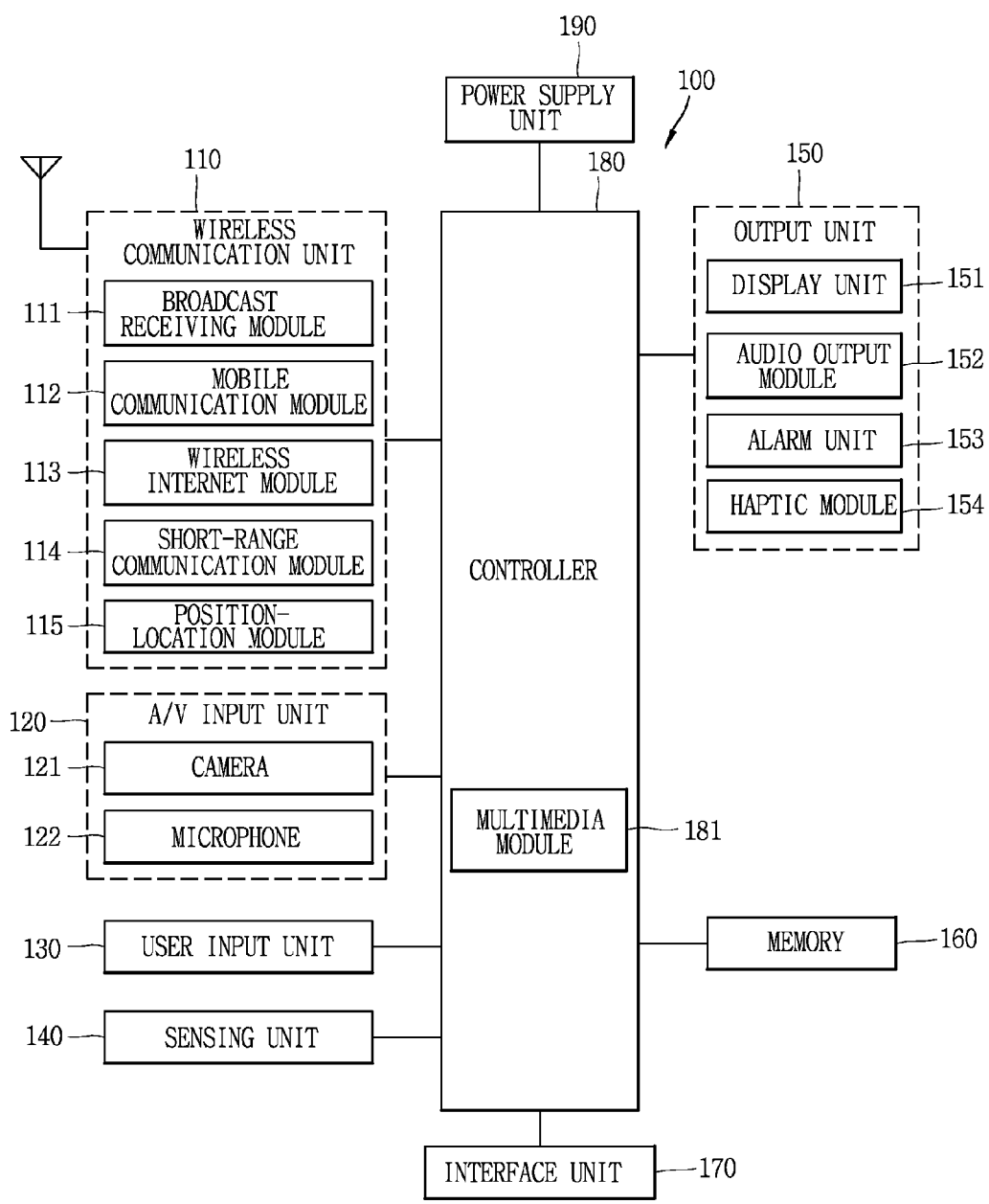
FIG. 1 is a block diagram of a mobile terminal according to an embodiment of the present invention.

FIG. 1 is a block diagram of a mobile terminal according to an embodiment of the present invention.

The mobile terminal 100 may include a wireless communication unit 110, an A/V (Audio/Video) input unit 120, a user input unit 130, a sensing unit 140, an output unit 150, a memory 160, an interface unit 170, a controller 180, and a power supply unit 190, etc. FIG. 1 shows the mobile terminal as having various components, but it should be understood that implementing all of the illustrated components is not a requirement. Greater or fewer components may alternatively be implemented.

The elements of the mobile terminal will be described in detail as follows.

The wireless communication unit 110 typically includes one or more modules allowing radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may refer to information associated with a broadcast channel, a broadcast program or a broadcast service provider. The broadcast associated information may also be provided via a mobile communication network and, in this case, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160.

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The wireless Internet module 113 supports wireless Internet access for the mobile terminal. This module may be internally or externally coupled to the terminal. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile terminal. A typical example of the location information module is a GPS (Global Positioning System).

With reference to FIG. 1, the A/V input unit 120 is configured to receive an audio or video signal. The A/V input unit 120 may include a camera 121 and a microphone 122. The camera 121 processes image data of still pictures or video obtained by an image capture device in a video capturing mode or an image capturing mode. The processed image frames may be displayed on a display unit 151.

The image frames processed by the camera 121 may be stored in the memory 160 (or other storage medium) or transmitted via the wireless communication unit 110. Two or more cameras 121 may be provided according to the configuration of the mobile terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate input data from commands entered by a user to control various operations of the mobile terminal. The user input unit 130 may include a keypad, a dome switch, a touch pad, a jog wheel, a jog switch, and the like.

The sensing unit (or a detection unit) 140 detects a current status (or state) of the mobile terminal 100 such as an opened or closed state of the mobile terminal 100, a location of the mobile terminal 100, the presence or absence of user contact with the mobile terminal 100 (i.e., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, a haptic module 154, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of them may be configured to be transparent or light-transmissive to allow viewing of the exterior, which may be called transparent displays. A typical transparent display may be, for example, a TOLED (Transparent Organic Light Emitting Diode) display, or the like. Through such configuration, the user can view an object positioned at the rear side of the terminal body through the region occupied by the display unit 151 of the terminal body.

The mobile terminal 100 may include two or more display units according to its particular desired embodiment. For example, a plurality of display units may be separately or integrally disposed on one surface of the mobile terminal, or may be separately disposed on mutually different surfaces.

Meanwhile, when the display unit 151 and a sensor (referred to as a 'touch sensor', hereinafter) for detecting a touch operation are overlaid in a layered manner to form a touch screen, the display unit 151 may function as both an input device and an output device. The touch sensor may have a form of a touch film, a touch sheet, a touch pad, and the like.

The touch sensor may be configured to convert pressure applied to a particular portion of the display unit 151 or a change in the capacitance or the like generated at a particular portion of the display unit 151 into an electrical input signal. The touch sensor may be configured to detect the pressure when a touch is applied, as well as the touched position and area.

When there is a touch input with respect to the touch sensor, a corresponding signal (signals) are transmitted to a touch controller. The touch controller processes the signals and transmits corresponding data to the controller 180. Accordingly, the controller 180 may recognize which portion of the display unit 151 has been touched.

With reference to FIG. 1, a proximity sensor 141 may be disposed within or near the touch screen. The proximity sensor 141 is a sensor for detecting the presence or absence of an object relative to a certain detection surface or an object that exists nearby by using the force of electromagnetism or infrared rays without a physical contact. Thus, the proximity sensor 141 has a considerably longer life span compared with a contact type sensor, and it can be utilized for various purposes.

Examples of the proximity sensor 141 may include a transmission type photoelectric sensor, a direct reflection type photoelectric sensor, a mirror-reflection type photoelectric sensor, an RF oscillation type proximity sensor, a capacitance type proximity sensor, a magnetic proximity sensor, an infrared proximity sensor, and the like. In case where the touch screen is the capacitance type, proximity of the pointer is detected by a change in electric field according to the proximity of the pointer. In this case, the touch screen (touch sensor) may be classified as a proximity sensor.

In the following description, for the sake of brevity, recognition of the pointer positioned to be close to the touch screen will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

By employing the proximity sensor 141, a proximity touch and a proximity touch pattern (e.g., a proximity touch distance, a proximity touch speed, a proximity touch time, a proximity touch position, a proximity touch movement state, or the like) can be detected, and information corresponding to the detected proximity touch operation and the proximity touch pattern can be outputted to the touch screen.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, or other sound generating device.

The alarm unit 153 may provide outputs to inform about the occurrence of an event of the mobile terminal 100. Typical events may include call reception, message reception, key signal inputs, a touch input etc. In addition to audio or video outputs, the alarm unit 153 may provide outputs in a different manner to inform about the occurrence of an event. For example, the alarm unit 153 may provide an output in the form of vibrations. When a call, a message, or some other incoming communication is received, the alarm unit 153 may provide tactile outputs (i.e., vibrations) to inform the user thereof. By providing such tactile outputs, the user can recognize the occurrence of various events even if his mobile phone is in the user's pocket. Outputs informing about the occurrence of an event may be also provided via the display unit 151 or the audio output module 152. The display unit 151 and the audio output module 152 may be classified as a part of the alarm unit 153.

The haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a phonebook, messages, still images, video, etc.) that are inputted or outputted. In addition, the memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

Also, when a state of the mobile terminal satisfies pre-set conditions, the controller 180 may execute a locked state for limiting an input of a control command of the user with respect to applications. Also, in a locked state, the controller may control a locked screen displayed on the locked state based on a touch input sensed through the display unit.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein.

Software codes can be implemented by a software application written in any suitable programming language. The software codes may be stored in the memory 160 and executed by the controller 180.

The mobile terminal according to an embodiment of the present invention described above with reference to FIG. 1, the mobile terminal in which components of the mobile terminal are disposed, or the structure of the mobile terminal will be described.

Figure 2A:
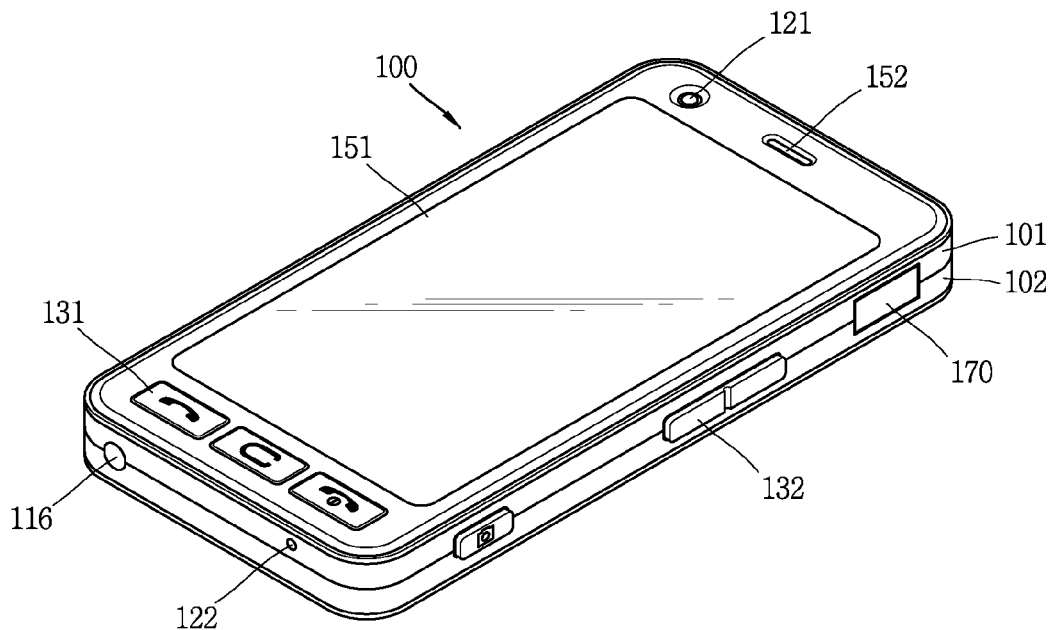
FIGS. 2A and 2B are front perspective views of the mobile terminal according to an embodiment disclosed in the present disclosure.
Figure 2B:
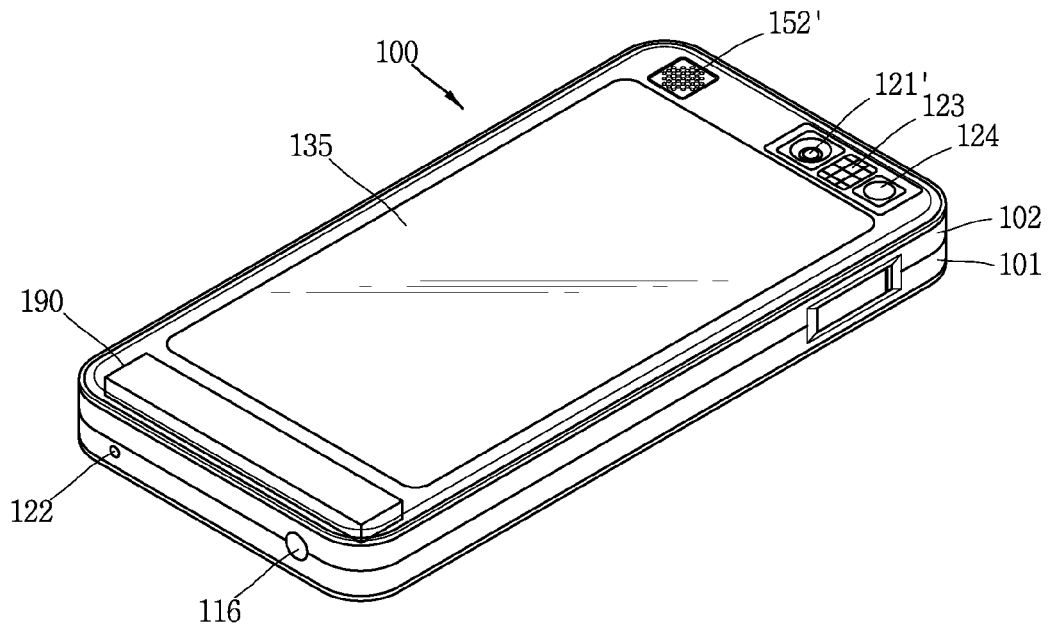

FIG. 2A is a front perspective view of the mobile terminal according to an embodiment of the present invention, and FIG. 2B is a rear perspective view of the mobile terminal illustrated in FIG. 2A.

The disclosed mobile terminal has a bar type terminal body. However, the present invention is not limited thereto and may be applicable to various structures such as a slide type mobile terminal, a folder type mobile terminal, a swing type mobile terminal, a swivel type mobile terminal, etc, in which two or more bodies are combined to be relatively movable.

As illustrated, the terminal body 100 (referred to as 'body', hereinafter) includes a front surface, a lateral surface, and a rear surface. Also, the body includes both ends formed in a length direction.

The body includes a case (or casing, housing, cover, etc.) constituting the external appearance. In this embodiment, the case may include a front case 101 and a rear case 102. Various electronic components are installed in the space between the front case 101 and the rear case 102. One or more intermediate cases may be additionally disposed between the front case 101 and the rear case 102.

The cases may be formed by injection-molding a synthetic resin or may be made of a metallic material such as stainless steel (STS) or titanium (Ti), etc.

The display unit 151, the audio output module 152, the camera 121, the user input unit 130/131, 132, the microphone 122, the interface unit 170, etc. may be disposed mainly on the front case 101.

The display unit 151 occupies the most of a main surface of the front case 101. The audio output unit 151 and the camera 121 are disposed at a region adjacent to one end portion among both end portions of the display unit 151, and the user input unit 131 and the microphone 122 are disposed at a region adjacent to another end portion. The user input unit 132 and the interface unit 170 may be disposed at the sides of the front case 101 and the rear case 102. The microphone 122 may be disposed on the other end of the body 100.

The user input unit 130 is manipulated to receive a command for controlling the operation of the mobile terminal 100 and may include a plurality of manipulation units 131 and 132. The manipulation units 131 and 132 may be generally referred to as a manipulating portion, and various methods and techniques can be employed for the manipulation portion so long as they can be operated by the user in a tactile manner.

Content inputted by the first and second manipulation units 131 and 132 can be variably set. For example, the first manipulation unit 131 may receive a command such as starting, ending, scrolling, etc., and the second manipulation unit 132 may receive a command such as controlling of the size of a sound outputted from the audio output unit 152 or conversion into a touch recognition mode of the display unit 151.

With reference to FIG. 2B, an audio output unit 152' may be additionally disposed on the rear surface of the terminal body. The audio output module 152' may implement stereophonic sound functions in conjunction with the audio output module 152 (See FIG. 2A) and may be also used for implementing a speaker phone mode for call communication.

The power supply unit 190 for supplying power to the mobile terminal 100 is mounted on the terminal body. The power supply unit 190 may be installed within the terminal body or may be directly attached to or detached from the exterior of the terminal body.

A touch pad 135 for detecting a touch may be additionally mounted on the rear case 102. The touch pad 135 may be configured to be light transmissive like the display unit 151. In this case, when the display unit 151 is configured to output visual information from both sides thereof, the visual information may be recognized also via the touch pad 135. Alternatively, a display may be additionally mounted on the touch pad so that a touch screen may be disposed on the rear case 102.

The touch pad 135 is operated in association with the display unit 151 of the front case 101. The touch pad 135 may be disposed to be parallel on the rear side of the display unit 151. The touch pad 135 may have the same size as the display unit 151 or smaller.

A camera 121' may additionally be disposed on the rear case 102 of the terminal body. The camera 121' may have an image capture direction which is substantially opposite to that of the camera 121 (See FIG. 2*a*), and have a different number of pixels than the camera 121.

For example, the camera 121 may have a smaller number of pixels to capture an image of the user's face and transmit such image to another party, and the camera 121' may have a larger number of pixels to capture an image of a general object and not immediately transmit it in most cases. The cameras 121 and 121' may be installed on the terminal body such that they can be rotatable or popped up.

A flash 123 and a mirror 124 may be additionally disposed adjacent to the camera 121'. When an image of a subject is captured with the camera 121', the flash 123 illuminates the subject. The mirror 124 allows the user to see himself when he wants to capture his own image (i.e., self-image capturing) by using the camera 121'.

Also, when the mobile terminal which may include at least one or more of the components as described above reproduces (or plays) a video, it may differently output a display format of subtitles according to sound characteristics in relation to the video.

A method for differently displaying subtitles according to sound characteristics by using the mobile terminal according to an embodiment of the present invention will be described with reference to the accompanying drawings.

Figure 3:
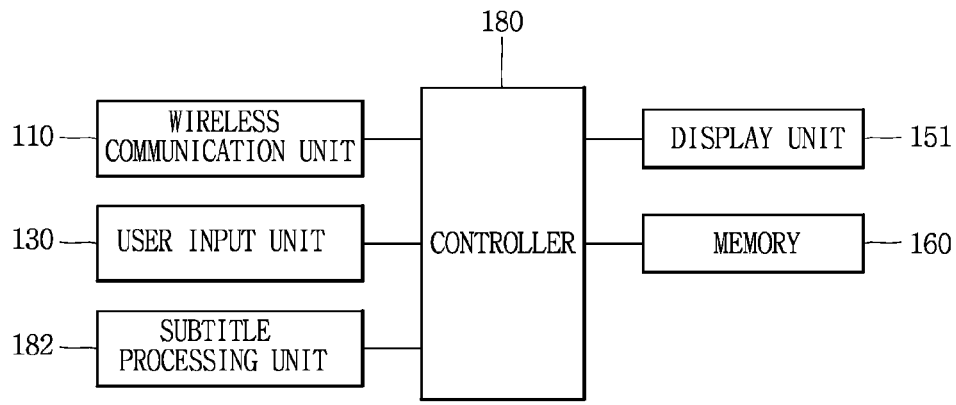
FIG. 3 is a block diagram schematically showing the mobile terminal according to an embodiment disclosed in the present disclosure.

FIG. 3 is a block diagram schematically showing the mobile terminal according to an embodiment disclosed in the present disclosure. Here, the same content already described above with reference to FIG. 1 will be omitted. With reference to FIG. 3, the mobile terminal 100 may include the controller 180, a subtitle processing unit 182, the wireless communication unit 110, the user input unit 130, the display unit 151, and the memory 160.

The controller 180 outputs a video to the display unit 151 based on a video reproduction command applied through the user input unit 130 or the touch-input available display unit 151.

Here, the video may be an image corresponding to a video file including image data and audio data. Namely, images in a continuously moving state like movie and a sound are output together.

The controller 180 may output a video corresponding to a video file previously stored in the memory 160 or may output a video corresponding to video data received in real time through the wireless communication unit 110.

When a video is output to the display unit 151, the subtitle processing unit 182 outputs subtitles in relation to the video to the display unit 151.

The subtitle processing unit 182 outputs subtitles at a timing corresponding to an image being output to the display unit 151.

The controller 180 controls the subtitle processing unit 182 to vary a display format of subtitles output from the subtitle processing unit 182 according to sound characteristics of the audio data in relation to the video being output to the display unit 151.

Thus, in an embodiment of the present invention, the subtitles output to the display unit 151 are not uniformly displayed in a standardized form but may be displayed variably according to sound characteristics of audio data.

Here, the sound characteristics, which are recognized through a data value of the audio data, may be classified into a pitch (number of vibrations or frequency), strength of sound (amplitude or a wave height value), a tone color (waveform or a style). The controller 180 may variably change subtitle display by using such sound characteristics.

For example, when the number of vibrations of a sound included in audio data is large, it may represent a high key (or a high-pitched tone), and when the number of vibrations of a sound included in audio data is small, it may represent a low key (or a low-pitched tone). When compared to a human's voice, in case of a voice of a woman, the number of vibrations is relatively large, and in case of a voice of a man, the number of vibrations is relatively small. Thus, the controller 180 may discriminate voices of men and women by using the vibration number information of a sound among various types of information included in audio data and differently display subtitles according to the discrimination results.

In another example, the controller 180 may discriminate a relatively large sound and a relatively small sound according to the amplitude of a sound included in audio data.

For example, when the amplitude of a sound is large, the strength of the sound is strong, and when the amplitude of a sound is small, the strength of the sound is weak. Namely, even when sounds are adjusted to have a similar level of sound volume, the controller 180 can discriminate a relatively large sound and a relatively small sound.

For example, when a person who is upset shouts (or makes a loud sound), the amplitude of the sound is large, and when a person whispers in a library, or the like, the amplitude of the sound is small.

Thus, the controller 180 may discriminate a loud voice and a quiet voice by using the amplitude information of sounds among various types of information included in audio data, and differently display subtitles according to the discrimination results.

In another example, the controller 180 may discriminate different voices, different natural voices, an animal sound, or a sound in a particular situation according to waveforms (styles or tone colors) of sounds.

The waveforms of a sound refer to the shape of waves uniquely generated from objects, and every object has its own waveform.

Thus, the controller 180 may be able to discriminate a sound included in audio data according to the waveforms of the sound. Namely, the controller 180 may discriminate whether the sound is from a person or from animal, or whether it is generated in a particular situation.

In this manner, the controller 180 may output subtitles realistically together when an image is output by using the information regarding a frequency, a wave height, and a waveform among various types of information of the audio data.

Meanwhile, whether to output subtitles may be determined according to a user selection, and in addition, a display format may be variably changed according to a user selection.

Also, the controller 180 may receive information regarding a display format of subtitles through the wireless communication unit 110 from an external system and variably display subtitles.

Namely, in this case, the external system may provide display information in relation to a color, a size, a position, and the like, of subtitles, and the controller 180 may change subtitles displayed on the display unit based on the received information.

For example, the controller 180 may match information in relation to the received subtitles to subtitle text stored in the memory 160, and change the subtitle text in various display formats to output subtitles to the display unit 151.

In another example, the controller 180 may receive subtitle text and display information regarding displaying of the subtitle text together from the external system and, and may variably change display formats of subtitles to output the corresponding subtitle to the display unit 151.

Also, the controller 180 may output subtitles in various display formats based on the information stored in the memory 160 when a video is reproduced, by using the subtitle text and subtitle-related display information stored in the memory 160.

Meanwhile, besides the display information of subtitles input from the outside as described above, the controller 180 may analyze audio data and image data included in a video file and variably control display format of subtitles.

Hereinafter, a method of controlling a video to output subtitles in various display format will be described in detail with reference to FIGS. 4 and 5.

Figure 4:
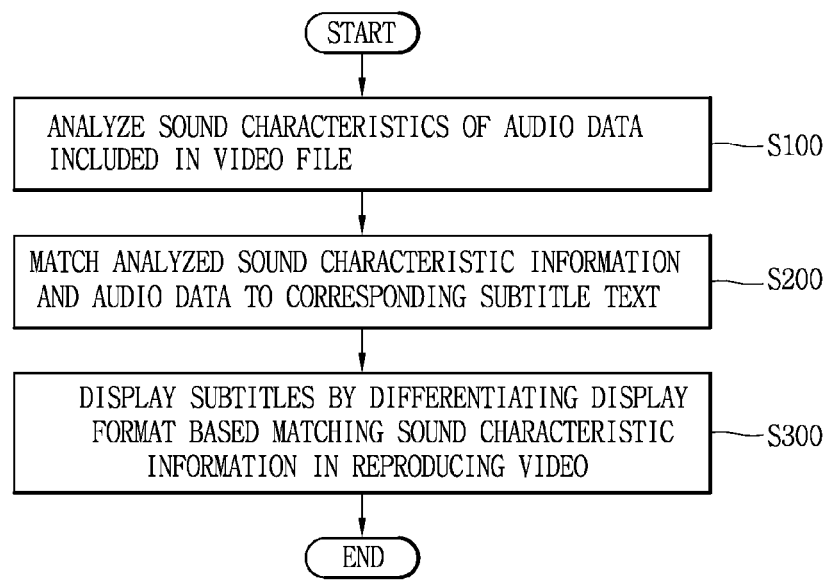

FIGS. 4 and 5 are flow charts illustrating a control method of the mobile terminal according to an embodiment disclosed in the present disclosure.

First, the controller 180 analyzes sound characteristics of audio data included in a video file (step S100). Here, as for a timing when the video file is analyzed by the controller 180, the video file is analyzed after a reproduction command with respect to the video file is applied, or the audio data may be automatically analyzed when the video file is stored in the memory 160, based on a user selection, even before a reproduction command is applied.

As described above, the controller 180 analyzes the sound characteristics of the audio data.

Namely, the controller 180 detects frequency information, amplitude information, and waveform information by analyzing the audio data. Meanwhile, the frequency information, the amplitude information, and the waveform information may be expressed as sound characteristic information.

The controller 180 matches the analyzed sound characteristic information to subtitle text (step S200).

Here, the subtitle text may be synchronized with the audio data corresponding to the sound characteristic information. The subtitle text may be previously stored in the memory 160 or may be generated by the controller 180 by analyzing the audio data.

Next, when a video reproduction command is applied by the user, the controller 180 outputs subtitles to the display unit 151 together with a video, by differentiating a display format of the subtitles according to matched sound characteristics information (step S300).

'Differentiating a display format of subtitles' refers to changing a display color of the subtitles, changing a display size of the subtitles, displaying the subtitles two-dimensionally or three-dimensionally, or the like, according to sound characteristic information.

The controller 180 may previously store information regarding how differently display subtitles according to sound characteristic information in the memory unit 160 and control displaying of subtitles according to the sound characteristic information with reference to the previously stored information.

For example, in case of a voice of a man, namely, in case of a low frequency, information of 'display in blue color' may be stored in the memory 160, and the controller 180 may display the subtitles in 'blue color' with reference to the information.

As described above, the controller 180 may extract sound characteristic information by analyzing audio data, and variably change displaying of subtitles according to the extracted sound characteristic information.

Meanwhile, the case of analyzing audio data has been described, but the controller 180 may also analyze image data included in a video file and process displaying of subtitles such that it is associated with image data.

Hereinafter, a method of analyzing image data in order to diversify display formats of subtitles will be described in detail.

First, the controller 180 analyzes sound characteristics of audio data included in a video file (step A100).

As for a timing when the video file is analyzed by the controller 180, the audio data may be automatically analyzed when the video file is stored in the memory 160, based on a user selection, after a reproduction command with respect to the video file is applied form the user or even before a reproduction command is applied.

The controller 180 may detect sound characteristic information such as frequency information, amplitude information, or waveform information by analyzing the audio data.

The controller 180 matches the analyzed sound characteristic information to subtitle text (step A200).

Here, the subtitle text may be synchronized with the audio data corresponding to the sound characteristic information. The subtitle text may be previously stored in the memory 160 or may be generated by the controller 180 by analyzing the audio data.

Next, the controller analyzes an object included in the image data based on the analyzed sound characteristic information (step A300).

The object included in the image data is an object included in an image output to the display unit 151, which refers to a person, an inanimate object (or matter), animal, or the like.

The controller 180 detects an object associated with the sound characteristic information from the image data corresponding to the audio data.

For example, when there are a 'man' and a 'woman' in the image corresponding to the image data and the sound characteristic information related to the corresponding image is 'low frequency', the controller 180 may analyze that the audio data and the 'low frequency' sound characteristic information are related to a 'man' object.

And, the controller 180 may analyze the object associated with a particular waveform among the sound characteristic information, and perform controlling to constantly display subtitles of the audio data having a particular waveform.

Here, a method for analyzing the object included in the image data may include various techniques, and in the present disclosure, a detailed description of a method for analyzing an image will be omitted.

Meanwhile, the controller 180 matches the sound characteristic information and subtitle text to the analyzed object (step A400).

The controller 180 may match coordinate information of the object displayed on the display unit 151, sound characteristic information, and subtitle text.

Thus, when a video is reproduced, the controller 180 may display subtitles in various display formats based on the matched sound characteristic information at a portion adjacent to the object (step S500).

Meanwhile, the method for analyzing the image data by the controller 180 has been described, and besides, a particular object may be selected from a user image and corresponding subtitles and sound characteristic information may be matched thereto.

Meanwhile, the method for analyzing image data as described above corresponds to an embodiment for implementing the present invention, so a method for displaying image data and subtitles is not limited to the foregoing method, an image data and subtitles may be associated to be processed in various manners.

As described above, in an embodiment of the present invention, the position in which subtitles are displayed is adjusted to be adjacent to an object corresponding to sound characteristic information, the user can easily recognize a subject that is currently making a sound, through the subtitles.

In the above, various methods for variably displaying subtitles by analyzing image data and audio data have been described.

To sum up, as the method for obtaining display information regarding subtitles, i) the method of receiving subtitle text and display information (including position information) related to subtitles from an external system and displaying subtitles based on the received information, ii) a method of analyzing at least one of audio data and image data and matching the same to subtitle text, and iii) a method of generating subtitle text by analyzing audio data, and analyzing sound characteristic information have been described.

Namely, display information regarding subtitles may be received from the outside, besides the method of performing analysis within a terminal. In an embodiment of the present invention, when subtitle display information is obtained by at least one of the various methods, a subtitle display format may be variably changed based on the obtained subtitle display information.

Hereinafter, a method of displaying subtitles in various formats by using at least one of the foregoing methods will be described in detail.

First, an embodiment of variably displaying subtitles according to sound characteristics corresponding to audio data will be described with reference to FIGS. 6A, 6B, 6C, and 7.

FIGS. 6A, 6B, 6C, and 7 are conceptual views explaining a method for displaying subtitles according to the characteristics of a sound in the mobile terminal according to an embodiment disclosed in the present disclosure.

Figure 6A:
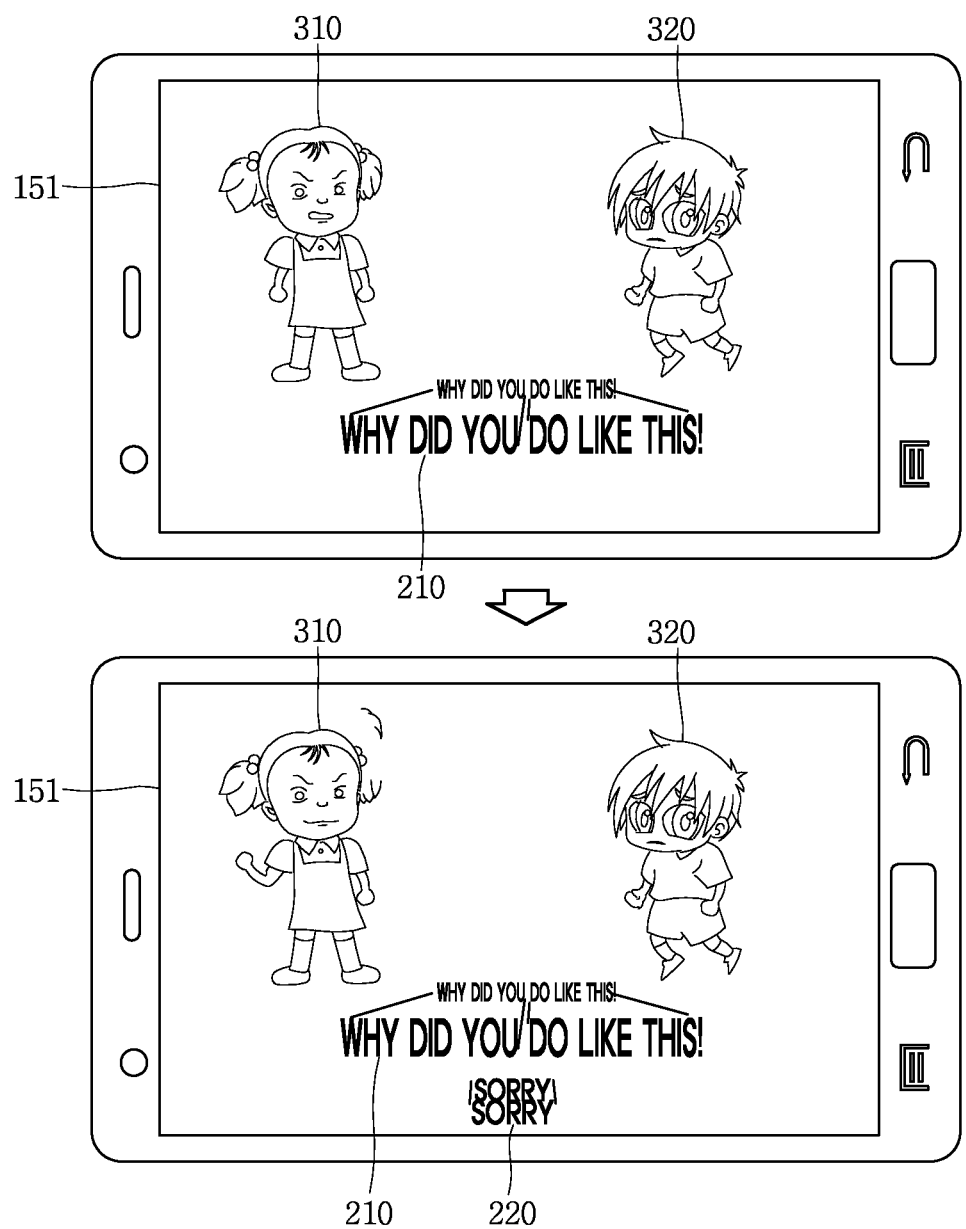

First, FIG. 6A is a conceptual view showing an embodiment in which a display format of subtitles are varied according to the strength (amplitude or a wave height value) of a sound among sound characteristics as described above.

As illustrated, when a video reproduction command is applied from a user, an image corresponding to a relevant video file is output to the display unit 151. In this case, when it has been set to display subtitles according to the video file by the user or the controller 180, the controller 180 varies a display format with reference to information of audio data in relation to an image being output to the display unit 151.

For example, when the strength, namely, the amplitude, of a sound corresponding to audio data is large the controller 180 may display the corresponding subtitles to be larger than the other subtitles.

Also, besides the changing only the size of the subtitles, the controller 180 may stereoscopically display subtitles.

When the strength, namely, the amplitude, of a sound corresponding to audio data is small, the controller 180 may display the corresponding subtitles to be smaller than the other subtitles.

In this manner, the controller 180 may change at least one of the display size of subtitles and a 3D effect (three-dimensional depth value) according to the strength of a sound corresponding to the audio data.

Also, the controller 180 may adjust a 3D effect (3D depth value) of the subtitles stereoscopically displayed according to the strength of a sound to allow the user to recognize information regarding how strong the sound is or how weak the sound is by intuition.

As illustrated, when the strength of a sound in relation to audio data corresponding to first subtitles 210 is large, the controller 180 may display the first subtitles 210 to be larger than the second subtitles 220 under the first subtitles 210. And, the controller 180 provides a larger 3D effect (3D depth value) to the first subtitles 210 to effectively transfer the emotion of the object 310 on the image.

Also, as illustrated, when the strength of a sound in relation to audio data corresponding to second subtitles 220 is small, the controller 180 may display the second subtitles 220 to be smaller than the first subtitles 210.

And, the controller 180 may express the 3D effect (3D depth value) of the second subtitles 220 such that it is less than the first subtitles 210 or may display the second subtitles 220 two-dimensionally without a 3D effect (3D depth value).

As described above, in the mobile terminal according to an embodiment of the present invention, since the size of subtitles or a 3D effect (3D depth value) of subtitles are displayed to be different, the user can feel an emotion line felt from the image only by the subtitles.

Figure 6B:
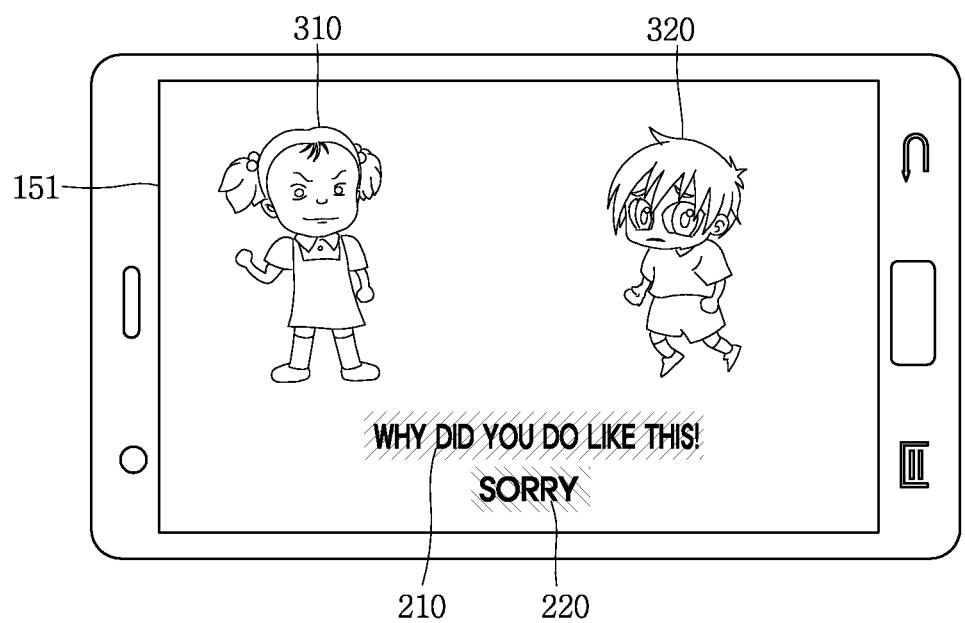

Next, FIG. 6B is a conceptual view showing an embodiment in which a display format of subtitles is varied according to the number of vibrations among the sound characteristics as described above.

The number of vibrations of a sound refers to a pitch of a sound. When the number of vibrations of a sound related to audio data is large, it represents a high-pitched tone (or a high key), and when the number of vibrations of a sound related to audio data is small, it represents a low-pitched tone (or a low key).

When compared to a human's voice, in case of a voice of a woman, the number of vibrations is relatively large, and in case of a voice of a man, the number of vibrations is relatively small. Thus, the controller 180 may discriminate voices of men and women by using the vibration number information of a sound among various types of information included in audio data and differently display subtitles according to the discrimination results.

Also, as mentioned above, although a man and a woman is not necessarily discriminated through the number of vibrations of a sound, the controller 180 may discriminate a sound having a relatively uniformly large number of vibrations and a relatively small number of vibrations and determine the voices of different people.

Thus, a display color of subtitles may be varied according to the number of vibrations of a sound (or a frequency) and output to the display unit 151.

As illustrated, when the audio data corresponding to the first subtitles 210 has a frequency uniformly higher than that of the audio data corresponding to the second subtitles 220, the controller 180 may differentiates the display colors of the first subtitles 210 and the second subtitles 220 and display the first subtitles 210 and the second subtitles 220 with an image.

Thus, the user may recognize that the first and second subtitles are related to different objects among objects included in the image.

Next, FIG. 6C is a conceptual view showing an embodiment in which a display format of subtitles is varied according to a waveform (or a style) of a sound among the sound characteristics as described above.

The controller 180 discriminates a unique sound of objects such as a sound of a human being, animal, nature, or the like, according to the waveform (or a style or a tone color) of a sound.

Thus, the controller 180 can discriminate different voices, different natural voices, an animal sound, or a sound in a particular situation according to waveforms (styles or tone colors) of sounds.

Thus, the controller 180 may be able to discriminate a sound included in audio data according to the waveforms of the sound. Namely, the controller 180 may discriminate whether the sound is from a person or from animal, or whether it is generated in a particular situation.

As illustrated, the controller 180 may differently display subtitles corresponding to audio data having different waveforms.

As illustrated, the controller 180 may vary the positions in which the first and second subtitles 210 and 220 are displayed based on different waveforms.

Also, the controller 180 may discriminate displaying of subtitles through various methods such as varying the size of displaying subtitles according to waveforms or changing the color of the subtitles.

In this manner, in the mobile terminal according to an embodiment of the present invention, by changing the position, color and size of subtitles according to the waveforms of a sound, even when a sound cannot be heard, intuitional information regarding an image can be provided to the user.

Figure 7:
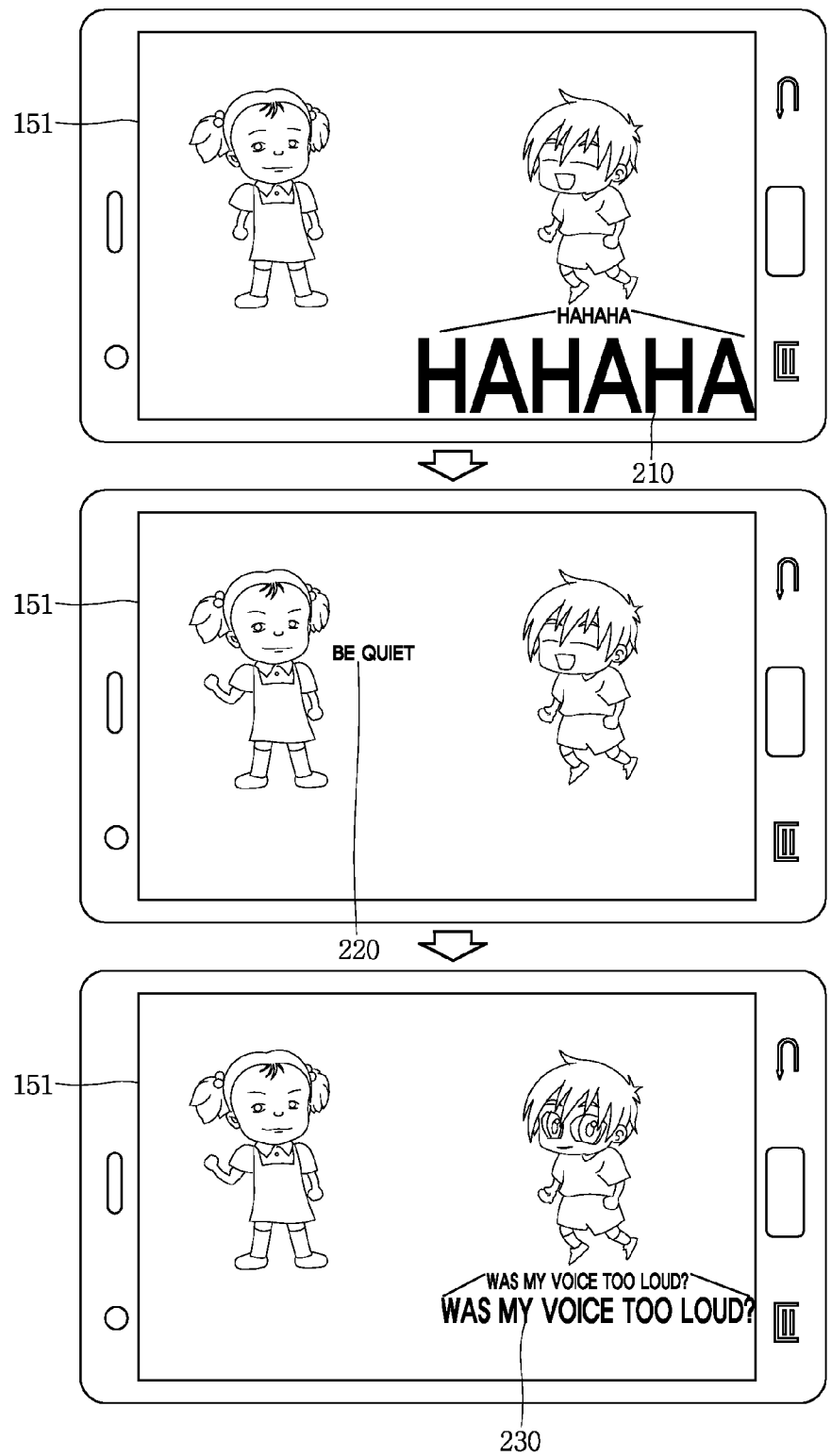

Also, as shown in FIG. 7, the controller 180 may vary a display format of subtitles in consideration of all of the number of vibrations, strength, waveforms, and the like, of a sound.

As illustrated, the controller 180 may display the first subtitles 210 corresponding to audio data having the highest strength of sound and a 3D effect (3D depth value) such that the first subtitles 210 are larger than the second and third subtitles 220 an 230.

And, the controller 180 may vary the positions in which the first and third subtitles 210 and 230 are displayed and the position in which the second subtitles 220 are displayed based on at least one of the waveforms of a sound and the number of vibrations.

As described above, in the mobile terminal according to an embodiment of the present invention, by varying the display formats of subtitles according to sound characteristics, an emotion and situation desired to be delivered through a 'sound' on an image can be effectively transferred to the user through the subtitles.

Hereinafter, a method of displaying an object included in an image and subtitles in an associated manner will be described with reference to FIGS. 8, 9, and 10.

Figure 8:
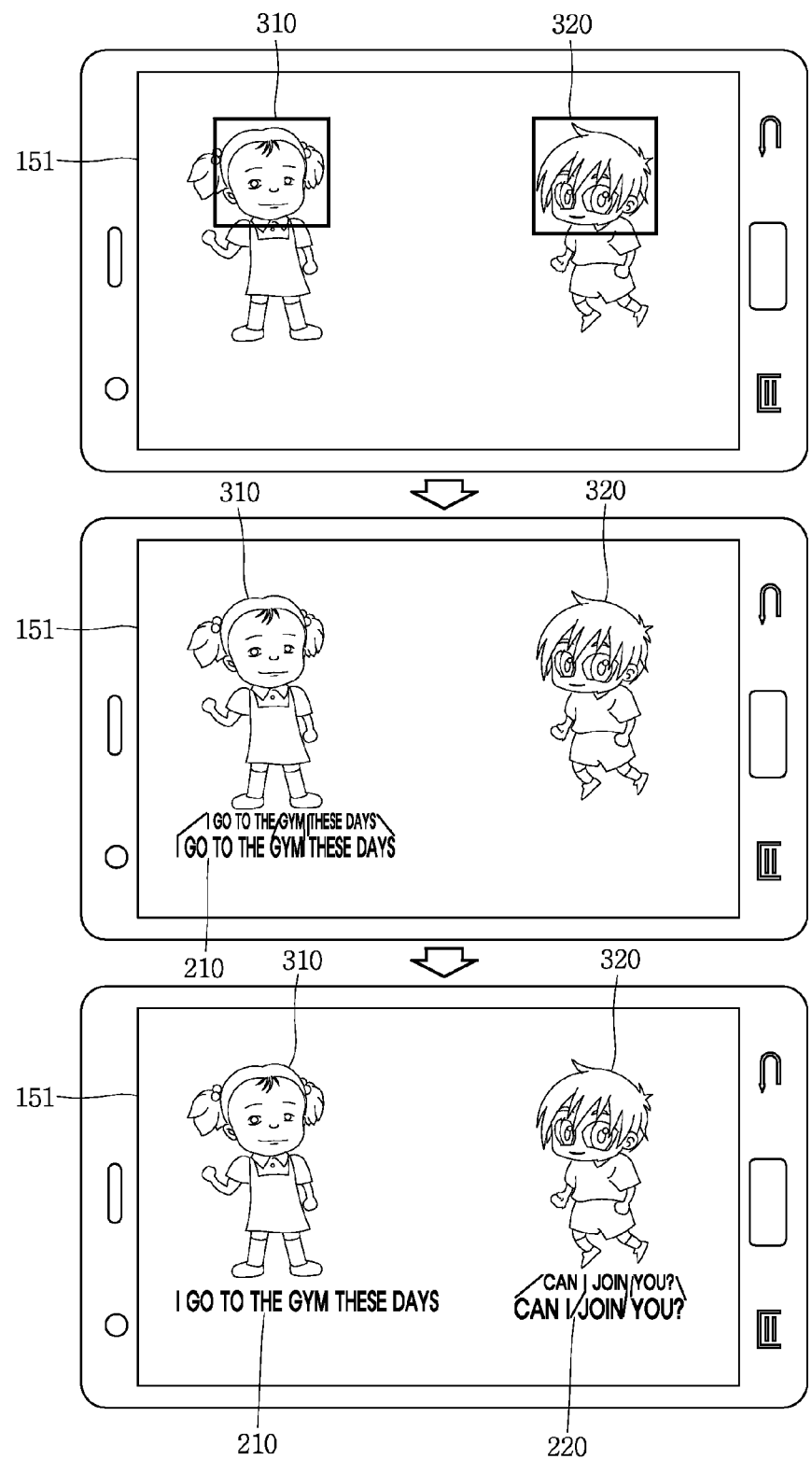
FIGS. 8, 9, and 10 are conceptual views explaining a method for displaying subtitles to correspond to an object in the mobile terminal according to an embodiment disclosed in the present disclosure.
Figure 9:
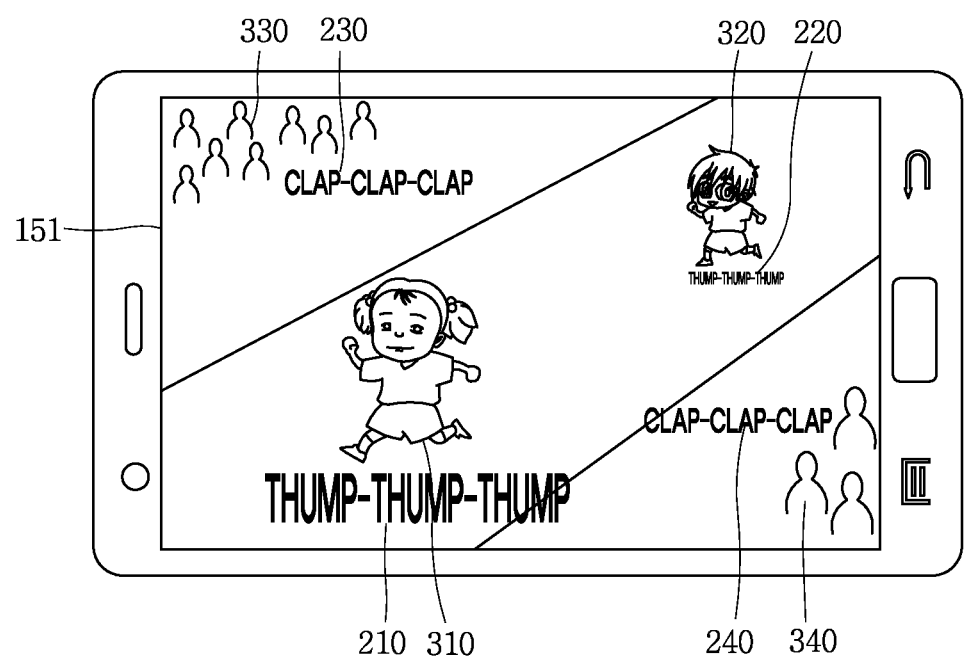
Figure 10:
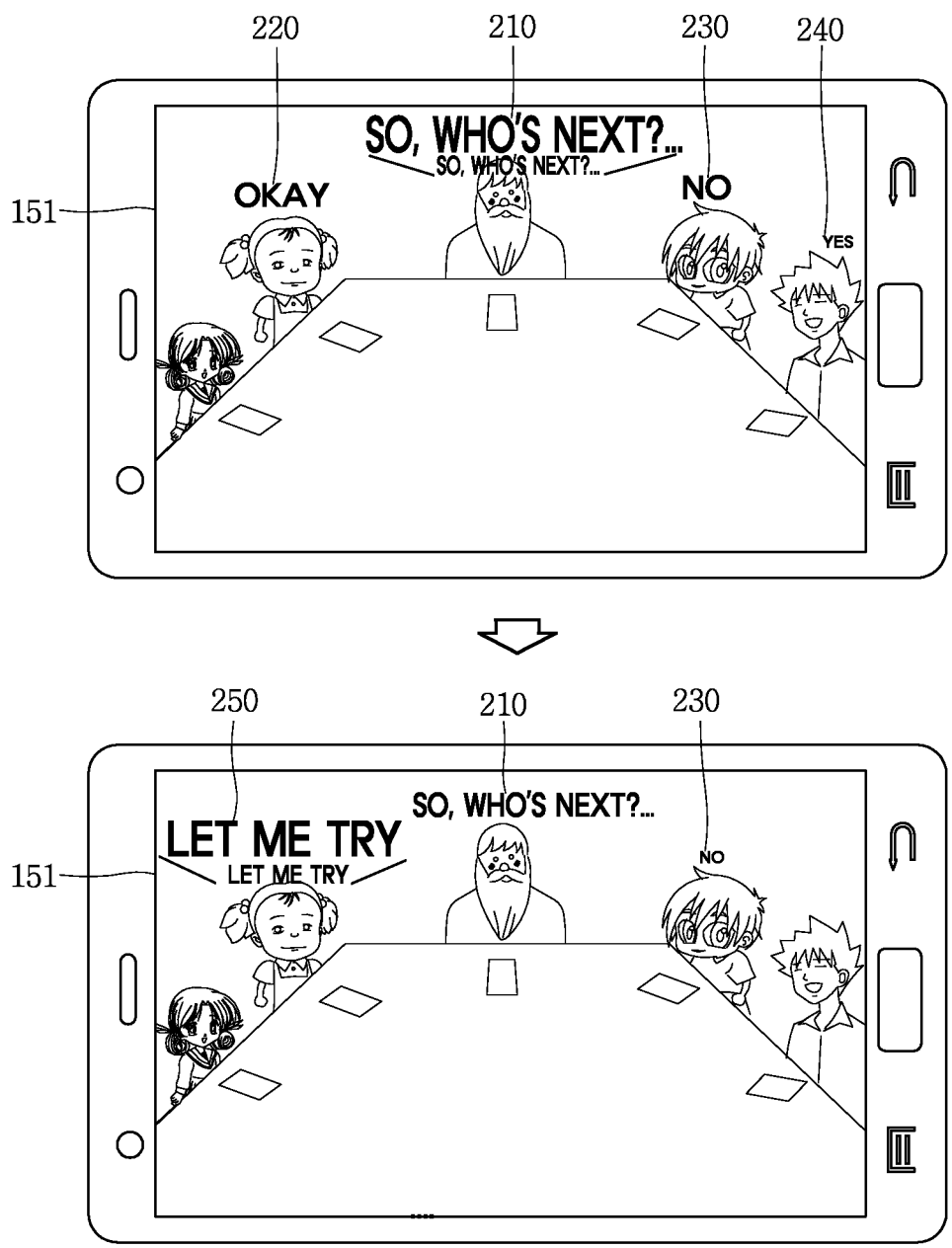

FIGS. 8, 9, and 10 are conceptual views explaining a method for displaying subtitles to correspond to an object in the mobile terminal according to an embodiment disclosed in the present disclosure.

An embodiment of a method for processing image data and subtitles by associating them has been described above with reference to FIG. 5.

Hereinafter, an embodiment implementing it in detail will be described.

The controller 180 may detect an object included in an image displayed on the display unit 151 by using various recognition algorithms such as a face recognition algorithm, an object recognition algorithm, and the like.

Here, as shown in FIG. 8, the object may be a first face 310 and a second face 320, and besides, the object may be an image itself corresponding to a person or an animal included in an image.

The controller 180 may set such that the first and second objects 310 and 320 detected as described above are positioned to be adjacent to subtitles.

In this case, the controller 180 may match the detected objects and associated audio data, and display the first subtitles 210 in relation to the audio data corresponding to the first object at a position adjacent to the first object 310.

To this end, the controller 180 matches sound waveforms corresponding to the first and second objects 310 and 320.

When a 'mouse' part of the first object 310 moves, the controller 180 detects a waveform of audio data to be output, and matches the detected waveform to the first object 310, thus associating the object and the waveform.

And, the controller 180 continuously associates a particular waveform and a particular object by using the foregoing matched waveform information, so that subtitles in relation to the same waveform audio data can be displayed adjacently only in the vicinity of the same object.

As illustrated, the controller 180 may display the first subtitles 210 corresponding to the first object 310 near the first object 310 and display the second subtitles 210 near the second object 320.

And, the controller 180 stereoscopically displays subtitles corresponding to currently output audio data to provide information regarding subtitles corresponding to a current situation to the user.

Thus, as illustrated, when audio data corresponding to the first object 310 is output, the controller 210 displays the first subtitles 210 three-dimensionally, and when audio data corresponding to the second object 320 is output, the controller 180 changes the first subtitles 210, which have been displayed three-dimensionally, into a 2D display format, and display the second subtitles 220 three-dimensionally.

Also, as shown in FIG. 9, the controller 180 may display subtitles on a position as a source of a sound of an image.

Also, even when a voice is not a voice output from a person, the controller 180 may display subtitles in relation to audio data included in a video file. Thus, the controller 180 displays the first and second subtitles 210 and 220 representing a footprint near the first and second objects 310 and 320 as sources of a sound, and display the third and fourth subtitles 230 and 240 representing a handclap sound near the third and fourth objects 330 and 340 as sources of a sound.

Also, as shown in FIG. 10, the controller 180 may provide information regarding the passage of time by using at least one of the size, a 3D effect, and a color of subtitles.

Namely, the controller 180 may display subtitles corresponding to currently generated audio data such that the subtitles are the largest, and display subtitles corresponding to audio data generated long time ago such that the subtitles are smaller.

As illustrated, the controller 180 may provide information regarding time order to the user by displaying the first subtitles 210 corresponding to the most recently generated audio data such that the subtitles 210 are larger than the other subtitles and three-dimensionally.

In this case, the fourth subtitles 240 corresponding to the audio data generated long time ago may be displayed to be smallest.

In a state in which the audio data related to the first subtitles 210 is generated, when audio data related to fifth subtitles is generated, the controller 180 may change the display of the first subtitles 210 into a two-dimensional display, display the fifth subtitles 250 three-dimensionally, and increases the size of the fifth subtitles 250 such that the fifth subtitles 250 are the largest.

And, the controller 180 make the fourth subtitles 240 related to the oldest generated audio data disappear, so that an appropriate number of subtitles can be displayed on the image all the time.

As described above, the mobile terminal according to an embodiment of the present invention displays an object and subtitles by associating them, and changes a display format of subtitles according to time order, thus allowing the user to easily understand an image.

Next, a method of processing by cooperatively operating amplitude information of a sound included in audio data and displaying of subtitles will be described with reference to FIGS. 11, 12, 13, and 14.

Figure 11:
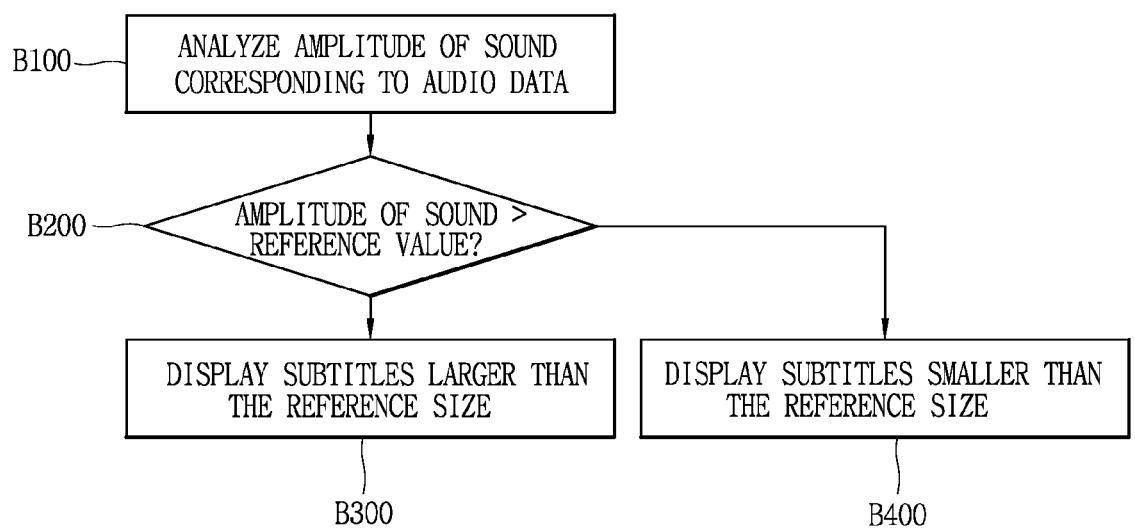
FIG. 11 is a flow chart illustrating a method for differently displaying subtitles according to the amplitude in the mobile terminal according to an embodiment disclosed in the present disclosure.
Figure 12:
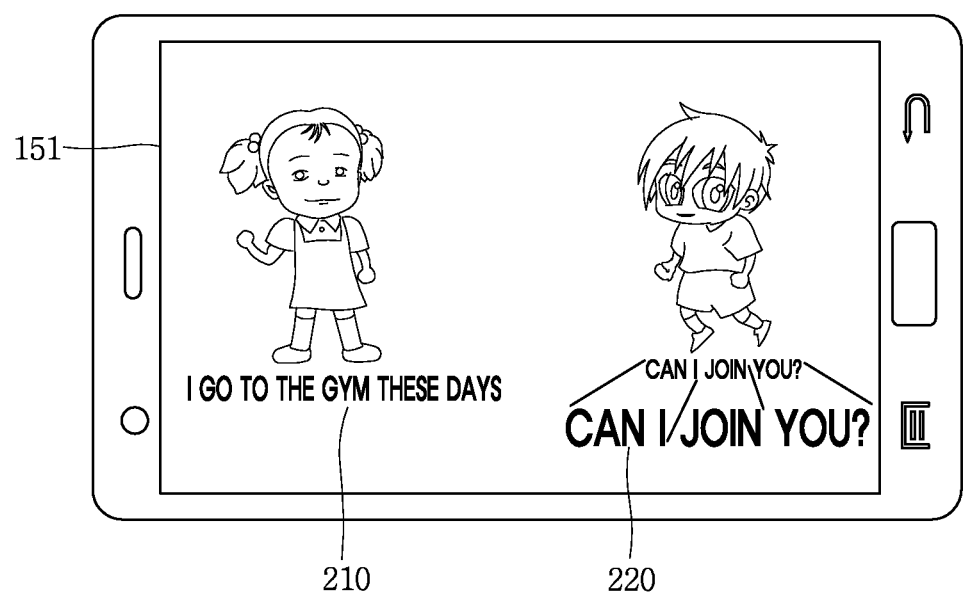
Figure 13:
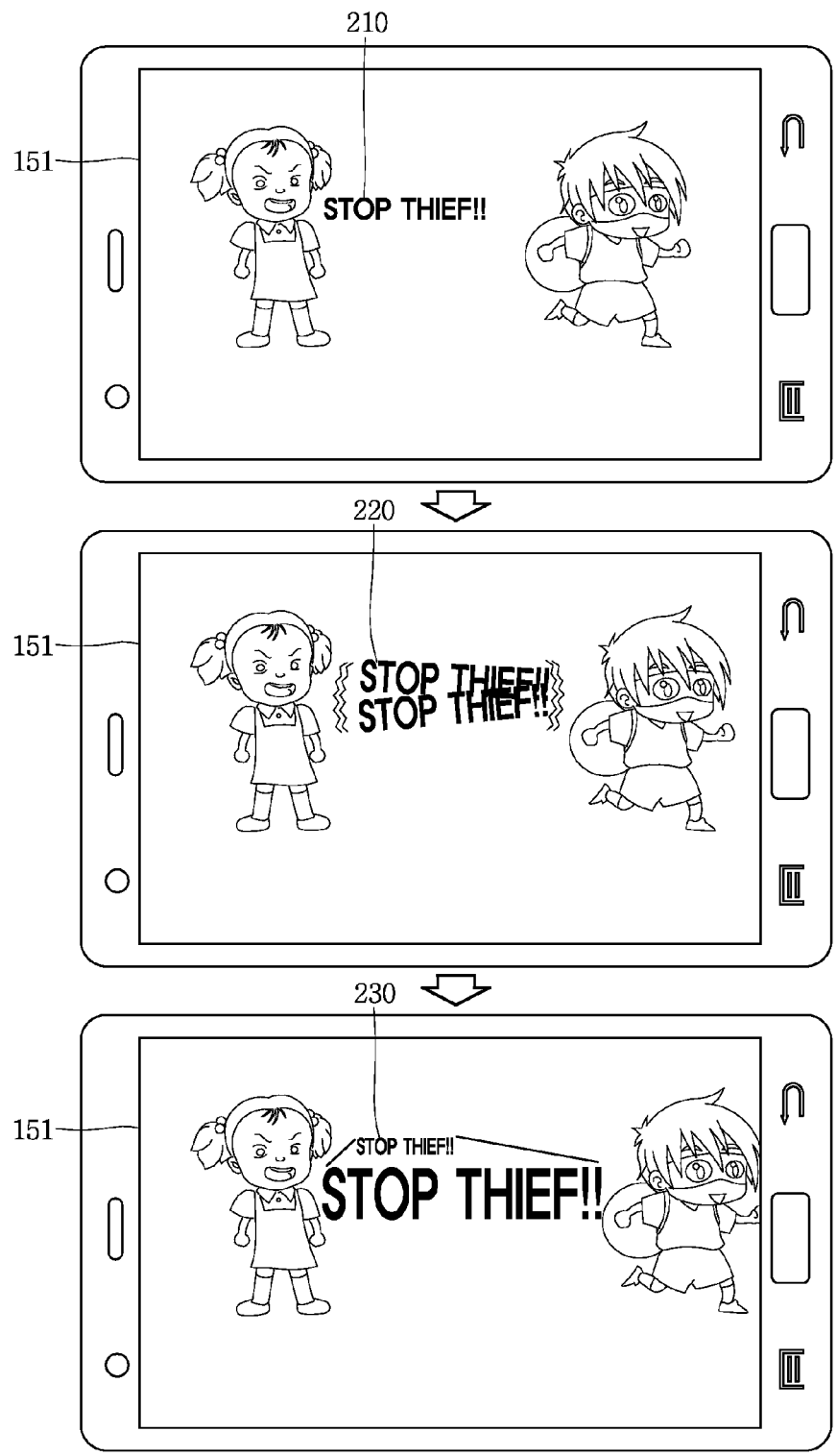

FIG. 11 is a flow chart illustrating a method for differently displaying subtitles according to the amplitude in the mobile terminal according to an embodiment disclosed in the present disclosure, and FIGS. 12, 13, and 14 are conceptual views explaining a method for displaying subtitles according to the amplitude in the mobile terminal according to an embodiment disclosed in the present disclosure.

With reference to FIG. 11, in an embodiment of displaying the size of subtitles differently according to the size of an amplitude among sound characteristics of audio data, the controller 180 analyzes information corresponding to the amplitude of a sound among information included in audio data (step B100).

The controller 180 compares the analyzed amplitude of the sound with a reference value (step B200).

When the analyzed amplitude of the sound is greater than the reference value according to the comparison results, the controller 180 displays the subtitles to be larger than the reference size (step B300). And, when the analyzed amplitude of the sound is smaller than the reference value according to the comparison results, the controller 180 displays the subtitles to be smaller than the reference size (step B400).

In this manner, the controller 180 determines a reference value in relation to the amplitude of a sound, analyzes a difference with the reference value, and changes the size of subtitles according to the difference.

Thus, when the amplitude corresponds to the reference value, subtitles are displayed to have a pre-set reference size.

For example, in FIG. 12, when the size of the first subtitles 210 is a reference size, the controller 180 may display the second subtitles 220 corresponding to the audio data having a larger amplitude than that of the audio data corresponding to the first subtitles 210 such that the second subtitles 220 are larger than the first subtitles 210. Also, the controller 180 may display subtitles three-dimensionally by using a 3D effect, as well as the size of the subtitles according to amplitude.

In addition, the controller 180 may change the size of subtitles according to audio data having a sound, namely, amplitude, which is gradually increased.

For example, as shown in FIG. 13, when the amplitude of audio data corresponding to the first subtitles 210 is gradually increased, the controller 180 may change the size of the first subtitles such that it corresponds to the amplitude which is gradually increased.

Thus, the controller 180 may change the size of the first subtitles 210 into the size of the second subtitles according to the change in the amplitude of the audio data. In this case, when the amplitude is rapidly increased, the controller 180 provides a movement effect to the second subtitles 220 to provide information regarding the corresponding situation to the user.

Also, the controller 180 may increase the size from that of the second subtitles 220 to the third subtitles 230 and use a 3D effect to further effectively provide information regarding the amplitude.

Also, as described above, with respect to audio data whose amplitude is gradually reduced, the controller 180 may reduce the size of subtitles or a 3D effect thereof.

In addition, as shown in FIG. 14, the controller 180 may display subtitles at a position corresponding to a source of a sound related to audio data in an image, and change a display size of subtitles according to a change in the amplitude at the position corresponding to the source of the sound.

As described above, in the mobile terminal according to an embodiment of the present invention, by differentiating the display size of subtitles according to a change in the amplitude, the user can recognize a large sound and a small sound through subtitles, so the user can understand content of an image without hearing the sound directly.

Also, in the mobile terminal according to an embodiment of the present invention, by differentiating a display format of subtitles according to sound characteristics related to a video, the user can easily recognize content related to the video through subtitles.

In addition, in the mobile terminal according to an embodiment of the present invention, by changing the size, a 3D effect, a color, or the like, of subtitles according to content of a video, the user can quickly recognize an emotion line and a situation in relation to content of the video through only subtitles.

The mobile terminal according to the embodiments of the present disclosure is not limited in its application of the configurations and methods, but the entirety or a portion of the embodiments can be selectively combined to be configured into various modifications.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A mobile terminal, comprising:
   a receiver configured to receive a content signal comprising video data and audio data;
   a display configured to display information; and
   a controller configured to control the display unit to:
   display video based on the received video data;
   display subtitles simultaneously with the displayed video, wherein content of the subtitles is based on the received audio data and at least a portion of the subtitles is displayed in a first size;
   gradually increase a size of the at least the portion of the displayed subtitles to a second size in proportion to an increase in a difference between a sound characteristic of the received audio data corresponding to the at least the portion of the displayed subtitles and a reference value while the subtitles are displayed when the corresponding sound characteristic is greater than the reference value;

gradually decrease the size of the at least a portion of the displayed subtitles to a third size in proportion to an increase in the difference between the corresponding sound characteristic and the reference value while the subtitles are displayed when the corresponding sound characteristic is less than the reference value; and provide the at least a portion of the displayed subtitles with a movement effect while the size of the at least a portion of the displayed subtitles is varied when the amplitude of the received audio data increases at greater than a preset rate.

2. The mobile terminal of claim 1, wherein sound characteristics of the received audio data are related to at least an amplitude or a number of vibrations.

3. The mobile terminal of claim 2, wherein the controller is further configured to control the display to:

display the at least a portion of the displayed subtitles in a two-dimensional (2D) format when the sound characteristics are less than a threshold; and display the at least a portion of the displayed subtitles in a three-dimensional (3D) format when the sound characteristics exceed the threshold.

4. The mobile terminal of claim 3, wherein the controller is further configured to control the display to vary a depth value of the at least a portion of the displayed subtitles in the 3D format based on a level of sound amplitude corresponding to the audio data that exceeds the threshold.

5. The mobile terminal of claim 1, wherein the controller is further configured to control the display to display the at least a portion of the displayed subtitles in a three-dimensional (3D) format.

6. The mobile terminal of claim 1, wherein
controller is further configured to control the display to display the at least a portion of the displayed subtitles in a color based on a sound waveform.

7. The mobile terminal of claim 1, wherein the controller is further configured to control the display to:

display the at least a portion of the displayed subtitles in a three-dimensional (3D) format when a sound amplitude corresponding to the received audio data is above a preset threshold; and vary depth value of the at least a portion of the displayed subtitles displayed in the 3D format based on a difference between the sound amplitude and the preset threshold.

8. The mobile terminal of claim 1, wherein the controller is further configured to control the display to vary a character thickness the at least a portion of the displayed subtitles based on changes of a sound amplitude.

9. A method for controlling a mobile terminal, the method comprising:

receiving a content signal via a receiver, the content signal comprising video data and audio data;

displaying video on a display based on the received video data;

displaying subtitles on the display simultaneously with the displayed video, wherein content of the subtitles is based on the received audio data and at least a portion of the subtitles is displayed in a first size;

gradually increasing a size of the at least the portion of the displayed subtitles to a second size in proportion to an increase in a difference between a sound characteristic of the received audio data corresponding to the at least the portion of the displayed subtitles and a reference value while the subtitles are displayed when the corresponding sound characteristic is greater than the reference value;

gradually decreasing the size of the at least a portion of the displayed subtitles to a third size in proportion to an increase in the difference between the corresponding sound characteristic and the reference value while the subtitles are displayed when the corresponding sound characteristic is less than the reference value; and providing the at least a portion of the displayed subtitles with movement effect while the size of the at least a portion of the displayed subtitles is varied when the amplitude of the received audio data increases at greater than a preset rate.

10. The method of claim 9, wherein sound characteristics of the received audio data are related to at least an amplitude or a number of vibrations.

11. The method of claim 10, further comprising:

displaying the at least the portion of the displayed subtitles in a two-dimensional (2D) format when the sound characteristics are less than a threshold;

displaying the at least the portion of the displayed subtitles in a three-dimensional (3D) format when the sound characteristics exceed the threshold.

12. The method of claim 11, further comprising varying a depth value of the at least the portion of the displayed subtitles in the 3D format based on a level of sound amplitude corresponding to the audio data that exceeds the threshold.

13. The method of claim 9, further comprising displaying the at least the portion of the displayed subtitles in a three-dimensional (3D) format.

14. The method of claim 9, further comprising displaying the at least the portion of the displayed subtitles in a color based on a sound waveform.

15. The method of claim 9, further comprising:

displaying the at least the portion of the displayed subtitles in a three-dimensional (3D) format when a sound amplitude corresponding to the received audio data is above a preset threshold; and varying a depth value of the at least the portion of the displayed subtitles displayed in the 3D format based on a difference between the sound amplitude and the preset threshold.

16. The method of claim 9, further comprising:

varying a character thickness the at least the portion of the displayed subtitles based on changes of a sound amplitude.

* * * * *